(12) United States Patent
Danilchenko et al.

(10) Patent No.: US 12,413,592 B2
(45) Date of Patent: Sep. 9, 2025

(54) SECURE DATA ORCHESTRATOR FOR IOT NETWORKS

(71) Applicant: Schneider Electric USA, Inc., Andover, MA (US)

(72) Inventors: Victor Danilchenko, South Hadley, MA (US); John Brodeur, Londonderry, NH (US)

(73) Assignee: Schneider Electric USA, Inc., Boston, MA (US)

( * ) Notice: Subject to any disclaimer, the term of this patent is extended or adjusted under 35 U.S.C. 154(b) by 255 days.

(21) Appl. No.: 17/775,336

(22) PCT Filed: Nov. 10, 2020

(86) PCT No.: PCT/US2020/059890
§ 371 (c)(1),
(2) Date: May 9, 2022

(87) PCT Pub. No.: WO2021/096891
PCT Pub. Date: May 20, 2021

(65) Prior Publication Data
US 2022/0394031 A1     Dec. 8, 2022

Related U.S. Application Data

(60) Provisional application No. 62/933,767, filed on Nov. 11, 2019.

(51) Int. Cl.
*H04L 9/40*     (2022.01)
*H04L 43/08*    (2022.01)
(Continued)

(52) U.S. Cl.
CPC ............ *H04L 63/102* (2013.01); *H04L 43/08* (2013.01); *H04L 63/0876* (2013.01);
(Continued)

(58) Field of Classification Search
CPC ..... H04L 43/08; H04L 63/0876; H04L 63/10; H04L 63/102; H04L 67/1072; H04L 67/12; H04L 67/63; H04W 4/38; H04W 4/70
See application file for complete search history.

(56) References Cited

U.S. PATENT DOCUMENTS 10,931,743 B1 *  2/2021  Chou ................. H04L 41/12
2009/0092124 A1  4/2009  Singhal et al.
(Continued)

FOREIGN PATENT DOCUMENTS

EP       2270622 A2    1/2011
EP       2270622 A3    8/2012
(Continued)

OTHER PUBLICATIONS

Extended European Search Report and Search Opinion dated Aug. 24, 2023 for corresponding European Patent Application No. 20888208. 4, 9 pages.

(Continued)

*Primary Examiner* — Jason D Recek
(74) *Attorney, Agent, or Firm* — Troutman Pepper Locke LLP (57) ABSTRACT

Techniques are described for securely routing data with an Internet of Things environment. A data orchestrator receives a plurality of data values collected by the endpoint device from an endpoint device and determines an identifier that uniquely identifies the endpoint device. The data orchestrator accesses one or more routing tables using the determined identifier and device type data corresponding to the plurality of data values to determine one or more data consumers to route the plurality of data values to. The one or more routing tables were dynamically generated based on at least one of (i) device claim information relating to the endpoint device, (ii) license data relating to the one or more data consumers, (Continued)

and (iii) user information associated with the one or more data consumers. The data orchestrator transmits at least a portion of the plurality of data values to the determined one or more data consumers.

21 Claims, 6 Drawing Sheets

(51) Int. Cl.
  *H04L 67/1061* (2022.01)
  *H04L 67/12* (2022.01)
(52) U.S. Cl.
  CPC .......... *H04L 63/10* (2013.01); *H04L 67/1072* (2013.01); *H04L 67/12* (2013.01)

(56) References Cited

U.S. PATENT DOCUMENTS

| | | |
|---|---|---|
| 2013/0179548 A1 | 7/2013 | Singh et al. |
| 2015/0019710 A1 | 1/2015 | Shaashua et al. |
| 2016/0127254 A1 | 5/2016 | Kumar et al. |
| 2018/0270231 A1* | 9/2018 | Bauer .................. H04L 63/061 |
| 2019/0028552 A1 | 1/2019 | Johnson, II et al. |

FOREIGN PATENT DOCUMENTS

| | | |
|---|---|---|
| EP | 3528148 A1 | 8/2019 |
| WO | 2019183628 A1 | 9/2019 |

OTHER PUBLICATIONS

Pahl et al. "An architecture pattern for trusted orchestration in IoT edge clouds." In: 2018 Third International Conference on Fog and Mobile Edge Computing (FMEC). Apr. 26, 2018. Retrieved on Jan. 12, 2021, 10 pp.

Wen et al. "Fog orchestration for IoT services: issues, challenges and directions." In: IEEE Internet Computing. Mar. 1, 2017. Retrieved on Jan. 12, 2021, 8 pp.

International Search Report and Written Opinion mailed Feb. 11, 2021 in International Application No. PCT/US2020/059890, 17 pp.

* cited by examiner

SECURE DATA ORCHESTRATOR FOR IOT NETWORKS

PRIORITY INFORMATION

The present application claims priority to U.S. provisional patent application 62/933,767, filed on Nov. 11, 2019, which is hereby incorporated by reference in its entirety.

TECHNICAL FIELD

The present disclosure relates to data processing, and more particularly, to a data orchestrator for securely managing data in Internet of Things (IoT) networks.

BACKGROUND

IoT networks deliver great value with highly available data and computing resources. However, such networks also bring significant security and privacy challenges. Conventionally, these challenges have been addressed via the concept of "tenancy" as the framework for data isolation, yet the traditional concept of tenancy possess significant limitations.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Internet of Things (IoT) networks deliver great value with seemingly omnipresent data and compute resources, yet also can pose significant challenges to security and privacy. Traditionally, these challenges are addressed via the concept of "tenancy" as the framework for data isolation. However, the traditional concept of tenancy poses significant limitations, particularly with the typical vertically integrated concept of tenancy. As such, embodiments provide a data orchestrator which overcomes the limitations of the traditional vertical tenancy model while preserving and improving on the security, privacy and regulatory compliance offered by these traditional solutions.

Generally speaking, the IoT brings pervasive computing to everyday life. Anything from a smart thermostat or a fridge to a smart assembly line or refinery safety equipment can be connected to the internet, delivering tremendous value in the form of both data and control capabilities. IoT data is becoming increasingly valuable, and generally the value of this data is unlocked largely through analytics. The analytics value cascade generally includes descriptive analytics that, e.g., describe what is happening, diagnostic analytics that, e.g., give details on malfunctions, predictive analytics that, e.g., can suggest maintenance before a malfunction occurs, prescriptive analytics that, e.g., can suggest changes to avoid before a malfunction occurs, and productive analytics that can, e.g., suggest how to improve a product and production.

However, the "value" of data is not a singular quantity, and generally the true value of data depends on the context. For example, for a given embodiment, the value of collected data can depend on the production of the data, the usage of the data, the need or demand for the data, the available supply of data, and so on. In many environments today, the value of the data exists but has yet to be unlocked. While much of the value of data can be unlocked within an offer or product context, a vast potential value also exists in relating various heterogeneous bodies of data to each other—across offers, across domains, across administrative boundaries, etc.

Currently the management and processing of IoT data are typically done using the concept of "tenancy" as a way of isolating data in different administrative domains from each other. In other words, tenancy serves as a framework for data isolation. Data isolation is frequently of critical importance, as it relates to several cross-cutting concerns such as security, privacy, and regulatory compliance. In conventional environments, tenancy is vertically integrated or "stovepiped." This approach greatly simplifies data isolation and thus facilitates addressing issues such as privacy and regulatory compliance. However, it also makes it very difficult to unlock the value inherent in cross-domain data sharing.

Embodiments described herein provide systems and techniques to enable the sharing of data between tenancy "stovepipes" by decoupling the different layers of IoT stack from each other within the tenancy context. By breaking up the "stovepipes" and allowing for data interchange at the data layer, embodiments can unlock the value of data which would be very difficult, if not impossible to unlock under conventional tenancy structures.

One embodiment includes an IoT-enabled architecture and platform that digitizes and simplifies low and medium voltage electrical distribution systems and provides actionable data to aid the decisions that help protect people, safeguard assets, maximize operational efficiency and business continuity and maintain regulatory compliance. One embodiment includes a power monitoring control system which includes physical devices and edge-monitoring capability to keep power reliable and efficient. The power monitoring control system can continuously collect the data of electrical power distribution systems via intelligent power devices and meters, and can transmit the collected energy and other related data to the cloud for additional processing, visualization, analytics and reporting. Such a power control monitoring system can help power-critical and energy-intensive facilities maximize uptime and operational efficiency. Additionally, such a system can provide insight into electrical system health and energy efficiency in order to improve performance and optimize business reliability and continuity.

Additionally, the IoT-enabled architecture and platform can include an advisor component that is a proactive, analytics-based service for power management systems, delivering optimized performance and power reliability. The advisor component may deliver actionable insights that can be used to improve the power system and can provide analytics to help audit the health of the system and electrical network. Moreover, an asset advisor component can provide a cloud-based monitoring service for critical electrical equipment. Using real-time device data, such a service can provide maximum protection of critical equipment through smart alarming, remote troubleshooting, and expert, data-driven insights. A facility advisor component can comprise cloud-based software to optimize facility operations, maintenance and energy management for buildings. The primary focus is to boost building performance and operating efficiency while optimizing operations and maintenance costs.

In such an embodiment, power management data is of great value to numerous aspects and components within the IoT-enabled architecture and platform. However, conventional solutions do not provide a way for one offer to allow other offers to receive the particular offer's data directly, as each conventional treats the devices within the respective offer as "their own" to due to the "stovepiped" tenancy model the used by conventional solutions which ensures that only application has easy access to the telemetry data transmitted by the PME devices.

However, in such an embodiment, it is desirable to stream data between endpoint devices and consumers based on the context of specific device ownership, access grants, and application licensing, as opposed to streaming all of the data to each individual offer in the application layer. That is, rather than transmitting all of the collected power management data to each offer, it is preferable to respect the "least privilege" principle, and to take user credentials, user roles, device claim information and so on into account. Doing so provides improved security, privacy, and regulatory compliance in the context of "de-stovepiped" tenancy.

As such, one embodiment described herein provides a method that includes receiving, at a data orchestrator, from an endpoint device, a plurality of data values collected by the endpoint device. The method further includes determining an identifier that uniquely identifies the endpoint device. Additionally, the method includes accessing one or more routing tables using the determined identifier and device type data corresponding to the plurality of data values to determine one or more data consumers to route the plurality of data values to. In one embodiment, the data orchestrator dynamically generated the one or more routing tables based on at least one of (i) device claim information relating to the endpoint device, (ii) license data relating to the one or more data consumers, and (iii) user information associated with the one or more data consumers. The data orchestrator can then transmit at least a portion of the plurality of data values to the determined one or more data consumers.

Figure 1:
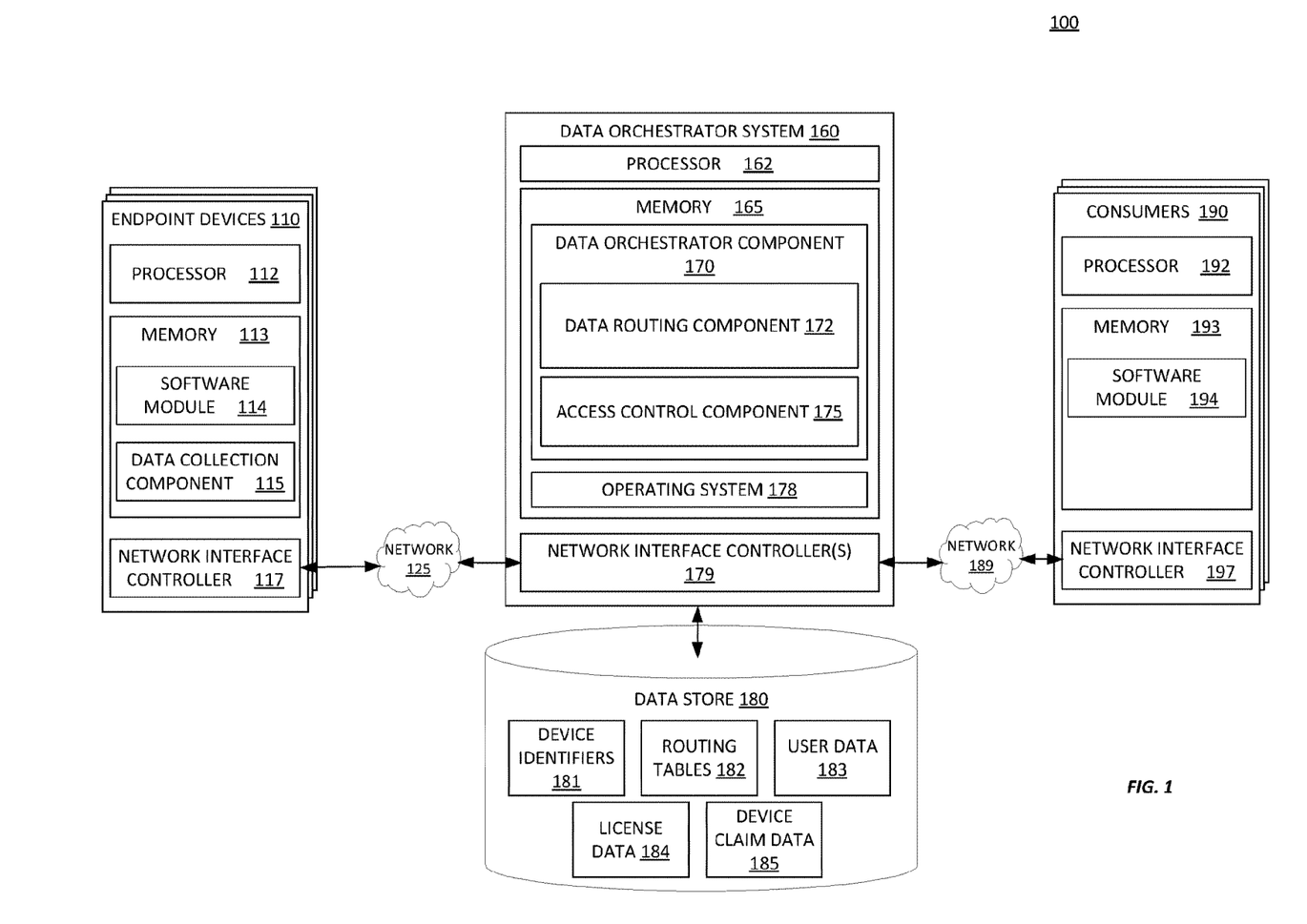
FIG. 1 illustrates a system configured with a data orchestrator component, according to one embodiment described herein.

FIG. 1 illustrates a system configured with a data orchestrator component, according to one embodiment described herein. As shown, the system 100 includes Endpoint Device 110 and a Data Orchestrator System 160, interconnected via a network 125, and the Data Orchestrator System 160 and Consumers 190, interconnected via a network 189. Generally, the networks 125 and 189 represent any suitable data communications networks, with examples including (without limitation) a local area network (LAN), a wide area network (WAN), an IEEE 802.11 wireless network, and so on. Moreover, the networks 125 and 189 may be the same type of data communication network or may be different types of data communications network, relative to one another.

The Data Orchestrator System 160 includes one or more computer processors 112, a memory 113, and a network interface controller 179. The memory 113 contains a data orchestrator component 170 and an operating system 178. Generally, the data orchestrator component 170 represents software logic that can install a software module on the Consumers 190 and validate the operation of the software module. As described herein, a software module refers to any software component, including (without limitation) device firmware, a software application, a module for a software application, a suite of software applications, and so on. Generally, the operating system 178 represents any suitable operating system for a computing device. Data Orchestrator System 160 is communicatively coupled to a data store 180.

The data store 180 in the depicted embodiment contains device identifiers 181, routing tables 182, user data 183, license data 184 and device claim data 185. Generally, the device identifiers 181 correspond to the unique identifiers that have been pre-assigned (e.g., by a manufacturer) to the endpoint devices 110. The routing tables 182 represent data structures for use in routing data between the endpoint devices and the consumers 190, and generally, the routing tables 182 are dynamically generated by the access control component 175 of the data orchestrator component. The user data 183 generally represents user identifiers, information, roles, permissions and more generally any other user-related data for users within the IoT environment. The license data 184 describes licenses held by the consumers 190 and/or the endpoint device 110, including status information on whether the licenses are valid, expiry information and dates for the licenses, and so on. The device claim data 185 indicates which devices have been claimed by which users, including the date of the any such claim, unique identifiers for the devices and users involved in the claim and so on.

The Endpoint Devices each include a processor 112, memory 113, and network controller 117. The Data Orchestrator System 160 contains a processor 162, memory 165 and network interface controller(s) 179. The Consumers 190 each include a processor 192, memory 193 and a network interface controller 197. Any general-purpose computer systems used in various embodiments of this disclosure may be, for example, general-purpose computers with general-purpose computer processors. For example, the processors 112, 162 and 192 may include processors based on Intel PENTIUM-type processor, Motorola PowerPC, Sun UltraSPARC, Hewlett-Packard PA-RISC processors, ARM-based processors or any other type of processor. Generally, the processors 112, 162 and 192 represent any suitable processor(s), including commercially available processors such as the well-known Pentium class processor available from the Intel Corporation. Many other processors are available. Such a processor usually executes an operating system (not shown) which may be, for example and without limitation, Microsoft® Windows®, Apple® macOS®, Solaris®, UNIX®, or Linux®. Many other operating systems may be used.

The memories 113, 165 and 193 generally represents any suitable form of addressable computer memory. For example, the memories 113, 165 and 193 may represent a volatile memory (e.g., static random-access memory (SRAM)) and/or a non-volatile memory (e.g., Flash memory). More generally, any suitable form of memory device(s) can be used, consistent with the functionality described herein. Generally, the processor and operating system together define a computer platform for which application programs in high-level programming languages are written. It should be understood that embodiments of the present disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

In the depicted embodiment, the memories 113 and 193 contain software modules 114 and 194, respectively. Additionally, the memory 113 contains a data collection component 115 that is generally configured to collect data for a data metric(s) on the endpoint devices 110. For example, in a power management context, the data collection component 115 could collect power metric data from one or more sensor devices of the endpoint devices 110. Generally, the software modules 114 and 194 represent application-specific software for the IoT environment. For example, in a power management context, the software modules 114 on the endpoint devices 110 could include power monitoring logic, while the software modules 194 could include power metric processing logic and monitoring and analytics services.

The Endpoint Devices 110, Data Orchestrator System 160 and Consumers 190 may use the network interface controllers 117, 179 and 197, respectively, to send and receive data on one or more data communication networks (e.g., networks 125 and 189). One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

As shown, the memory 165 also contains an operating system 178. Generally, the operating system 178 manages at least a portion of the hardware elements included in Data Orchestrator System 160. Usually, a processor or controller, such as processor 162, executes an operating system which may be, for example, a Windows-based operating system, such as, Windows 10, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The data orchestrator component 170, as shown, contains a data routing component 172 and an access control component 175. Generally, the data orchestrator component 170 is configured to route data between the endpoint devices 110 and the consumers 190 in a secure manner, while avoiding the limitations of conventional tenancy models. In one embodiment, the data orchestrator component 170 receives, from an endpoint device 110, a plurality of data values collected by the endpoint device 110. The access control component 175 can determine an identifier that uniquely identifies the endpoint device. For example, the access control component 175 could determine a unique identifier that corresponds to the endpoint device 110 by accessing the device identifiers 181 in the data store 180, and could further determine device claim data 185 corresponding to the unique identifier of the endpoint device 110.

The access control component 175 could dynamically generate one or more routing tables 182 based on at least one of (i) device claim information relating to the endpoint device, (ii) license data relating to the one or more data consumers, and (iii) user information associated with the one or more data consumers. The data routing component 172 could then access the generated routing tables 182 using the determined identifier and device type data corresponding to the plurality of data values to determine one or more data consumers to route the plurality of data values to. The data routing component 172 could then transmit at least a portion of the plurality of data values to the determined one or more data consumers.

Figure 2:
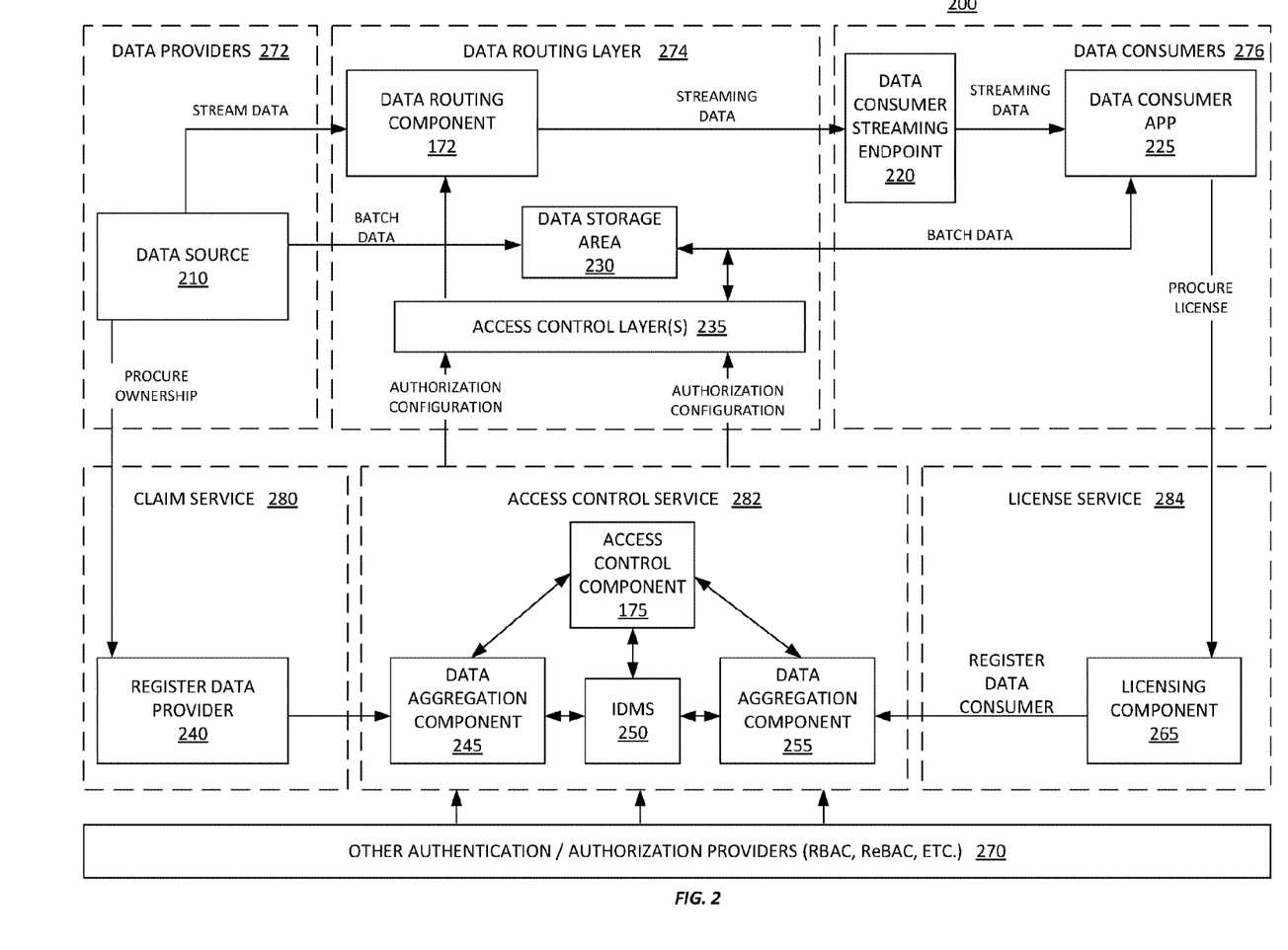
FIG. 2 is a block diagram illustrating a system configured with a data orchestrator component and a data flow within the system, according to one embodiment described herein.

FIG. 2 is a block diagram illustrating a system configured with a data orchestrator component and a data flow within the system, according to one embodiment described herein. As shown, the system 200 includes data providers layer 272, a data routing layer 274, a data consumers layer 276, a claim service 280, an access control service 282 and a license service 284. Within the data providers layer 272, a data source 210 procures ownership credentials from a register data provider 240 within the claim service layer 280. For example, the data source 210 could be an endpoint device 110, and the data source 210 could procure the ownership credentials from the register data provider 240 as part of a device registration process.

In the depicted embodiment, the data source 210 streams data to the data routing component 172 within the data routing layer 274. Generally, the access control layer(s) 235 can consume the access control data from the access control service 282, and can generate and provide routing information to the data routing component 172. The data routing component 172 can combine such data routing information and access control data with actual access context information (e.g., one or more assess claim tokens presented by the data consumer application 225 on behalf of a user) to determine whether and how to route each piece of data. This enables the data routing layer 274 to correctly deliver a customized data view to the application and user for consumption, while ensuring security and data privacy requirements are met.

Moreover, the data routing layer 274 can do so for both batch data and streaming data. Generally, the data routing layer 274 can selectively provide data from the data providers 272 to the data consumers 276 in a number of different ways, including a pub/sub methodology (e.g., where the data consumer application 225 subscribes to one or more types of data, and the data routing layer 274 publishes data received from the data providers 272 to authorized subscribers), a push methodology (e.g., where the data routing layer 274 selectively transmits data received from the data providers 272 to one or more data consumers 276), a pull methodology (e.g., where the data routing layer 274 stores data received from the data providers 272 in the data storage area 230, and the stored data can be provided to data consumers 276 the access control layer(s) 235 determines have sufficient authorization to access the data upon request), and so on. For example, in the case of streaming data, the data routing layer 274 could employ a pub/sub methodology or a push methodology to transmit the data to the data consumers 276. As another example, in the case of batch data, the data routing layer 274 could store the data in the data storage area 230 and authorized data consumers 276 can pull the data from the data storage area 230 upon authorization by the access control layer(s) 235.

The data routing component 172 also receives authorization and data routing information from the access control service 282, via the access control layer(s) 235. Such authorization information can include real-time data from the Identity Management Service (IDMS), and can include identifying a user(s) associated with the data source 210 (e.g., a user setup as an owner of the data source device), a role(s) of the user, device claim information relating to the user and/or the data source 210, and so on. Additionally, the authorization and routing configuration data can include license data Generally, the routing configuration information received from the access control service 282 can include one or more routing tables 182 that specify how to route data of various types and from various sources.

Additionally, the data source transmits batch data to a data storage area component 230 within the data routing layer 274. An access control layer(s) 235 within the data routing layer 274 receives authorization configuration data from the access control service 282, and using these data selectively transmits the batch data (or a portion of the filtered batch data) to the data consumer app 225 within the data consumers layer 276. The streaming and batch data received by the data consumer application 225 can then be processed and used in an application-specific manner. For example, in a power management context, the data could be processed to generate various analytics, used by monitoring services, used to generate a visualization of the state of the data source 210, or more generally for any other suitable purpose.

The access control service 282 includes the access control component 175, as well as data aggregation components 245 and 255 and the IDMS 250. Generally, the data aggregation components 245 and 255 are configured to collect data from various sources and to aggregate and normalize these data for consumption by the access control component 175. For example, the data aggregation component 245 in the depicted example collects data from the register data provider 240, the IDMS 250 and the other authentication/authorization providers 270. The data aggregation component 245 could then aggregate and normalize the data, and then provide the normalized data to the access control component 174 for use in generating the authorization and routing configurations.

Generally, the access control service 282 can consume various access claims and rights data (e.g., from the claim service 280, licensing service 284, and additional access control providers such as Role-based Access Control (RBAC) or Relationship-based Access Control (REBAC) services) and can generate access control configurations and/or structures consumed by the data routing layer 274. For example, the access control component 175 can dynamically generate one or more routing tables based on the authorization and routing configuration information, and these routing tables can be provided to the data routing component 172, which can use the routing table to selectively route the streaming data to a data consumer streaming endpoint 220. Doing so enriches existing access control data, and may further allow access control data to be constructed from scratch, in a manner reflective of both the data provider access rights (e.g., devices emitting telemetry streams) and data consumer access rights (e.g., advisor applications), as well of enterprise access control relationships and grants, such as what may be supplied by enterprise access-control system. Generally, the access control service has enough information to provide customized, least-privilege view of data for a given use context (e.g., a user viewing historical data, dashboard data, analytics report, etc.), while also respecting the user's relationship to the broader data ownership, lineage, and governance contexts, such as when the user is acting on behalf of an enterprise which is the actual owner of the data provider devices.

The data consumer application 225 can procure a license from the licensing component 265 within the license service 284. Generally, embodiments described herein can be adapted to work with a number of different license services, and such services may have various requirements and/or payment methods for granting and renewing licenses. In the context of the depicted embodiment, the access control service 282 additionally receives data from the licensing component 265. For example, the access control service 282 could provide an indication that the data consumer application 225 has one or more valid licenses. Depending on the context, such licenses may grant the data consumer application 225 access to various types of data from data sources 210.

Likewise, the access control service 282 can receive device claim information from the register data provider 240 of the claim service 280. Such information can describe, for example and without limitation, one or more users associated with a registered data source 210, an organization or other entity associated with the registered data source 210, and so on.

Additionally, the access control service 282 can receive data from a number of other sources and can use this information when dynamically generating the routing tables. In the depicted embodiment, the access control service 282 receives information from other authentication/authorization providers 270, which may include Role-based Access Control (RBAC) services, Relationship-based Access Control (ReBAC) services, and so on. More generally, any other information that is suitable for use in access control determinations can be used, consistent with the functionality described herein.

Figure 3:
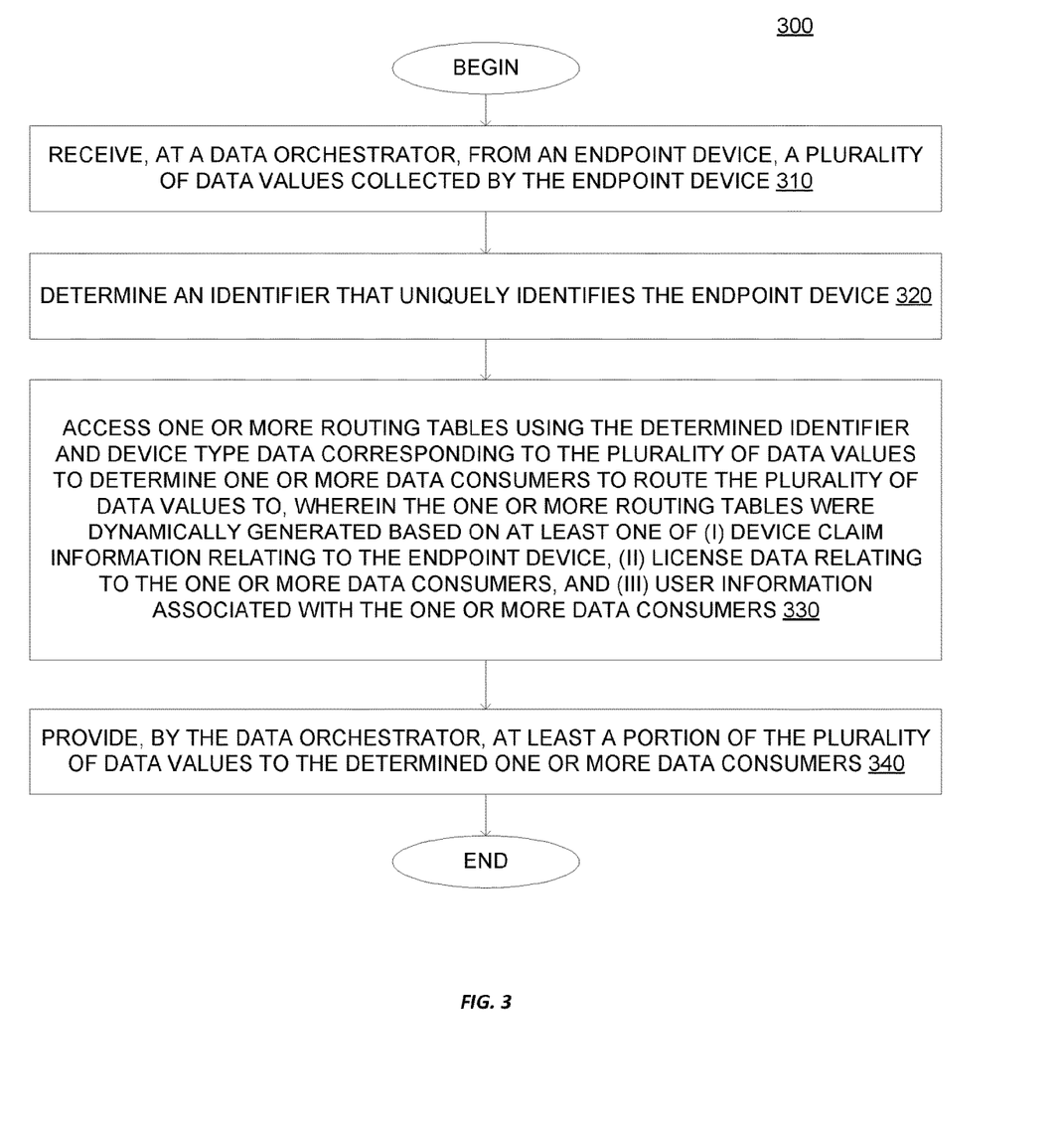
FIG. 3 is a flow diagram illustrating a method for orchestrating data in an IoT network, according to one embodiment described herein.

FIG. 3 is a flow diagram illustrating a method for orchestrating data in an IoT network, according to one embodiment described herein. As shown, the method 300 begins at block 310, where the data orchestrator component 170 receives a plurality of data values collected by an endpoint device. The data orchestrator component 170 determines an identifier that uniquely identifies the endpoint device (block 320). The data orchestrator component 170 then accesses one or more routing tables using the determined identifier and device type data corresponding to the plurality of data values to determine one or more data consumers to route the plurality of data values to (block 330). In one embodiment, the one or more routing tables are dynamically generated based on at least one of (i) device claim information relating to the endpoint device, (ii) license data relating to the one or more data consumers, and (iii) user information associated with the one or more data consumers. For example, the data routing component 172 of the data orchestrator component 170 could access the device claim data 185, license data 184 and user data 183 within the data store 180 and could use predefined route generation logic to generate the routing tables 182. The data orchestrator component 170 provides at least a portion of the plurality of data values to the determined one or more data consumers (block 340), and the method 300 ends.

Figure 4A:
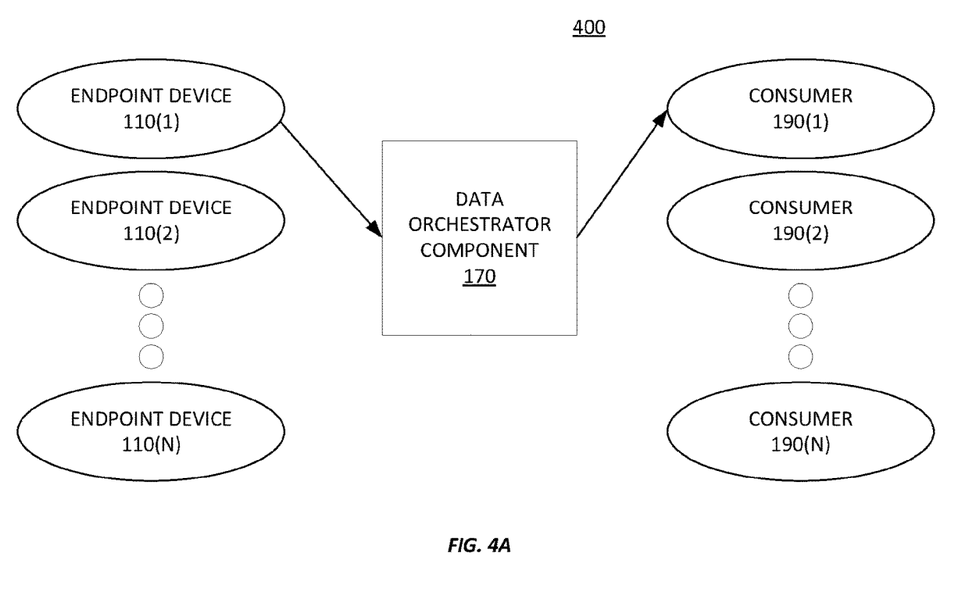
FIGS. 4A-E are block diagram illustrating potential data routing schemes, according to embodiments described herein.

FIGS. 4A-E are block diagram illustrating potential data routing schemes, according to embodiments described herein. FIG. 4A is a block diagram 400, illustrating a one-to-one data routing scheme. In the depicted embodiment, the data orchestrator component 170 is receiving data from a single endpoint device 110(1) and, based on the dynamically generated routing tables 182, the data orchestrator component 170 determines to transmit the received data on to a single consumer 190(1).

Figure 4B:
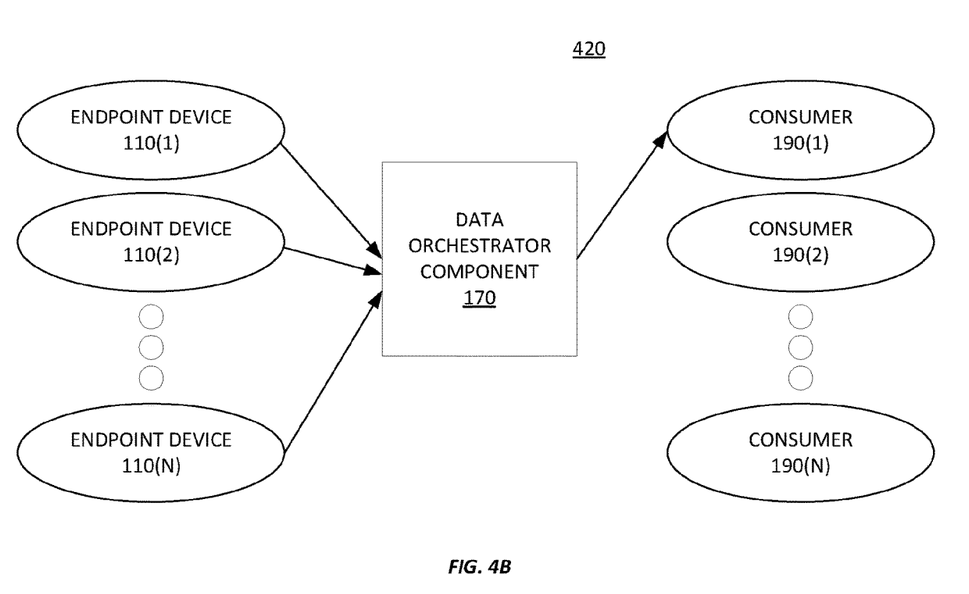

FIG. 4B is a block diagram 420, illustrating a many-to-one data routing scheme. In the depicted embodiment, the data orchestrator component 170 receives data from multiple endpoint devices 110(1)-(N) and, based on the dynamically generated routing tables 182, the data orchestrator component 170 determines to transmit the data to a single consumer 190(1). As discussed above, the access control component 175 of the data orchestrator component 170 could dynamically generate the routing tables 182 based on device claim information for the endpoint devices 110(1)-(N), as well as license data 184 and user data 183 relating to the consumer 190(1).

Figure 4C:
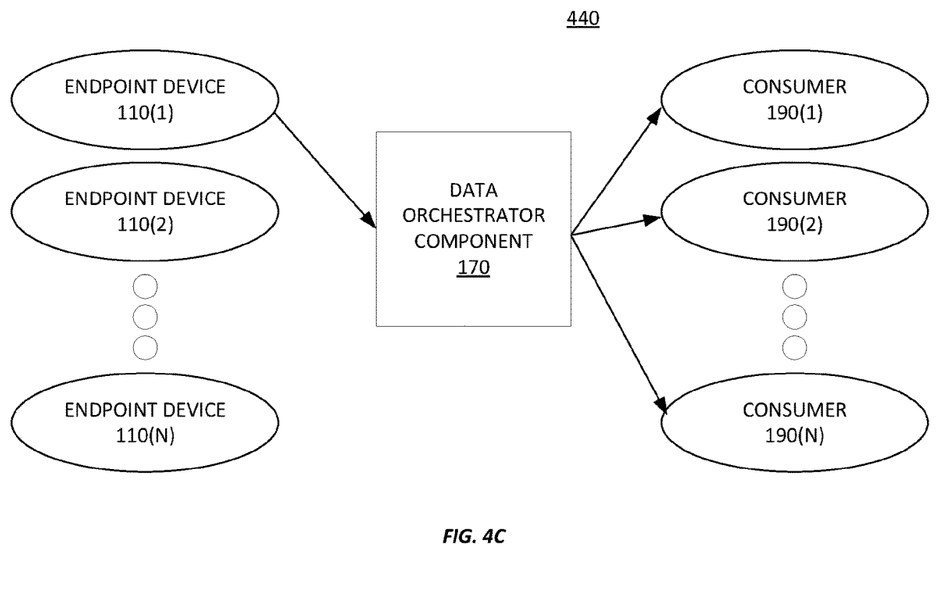
Figure 4D:
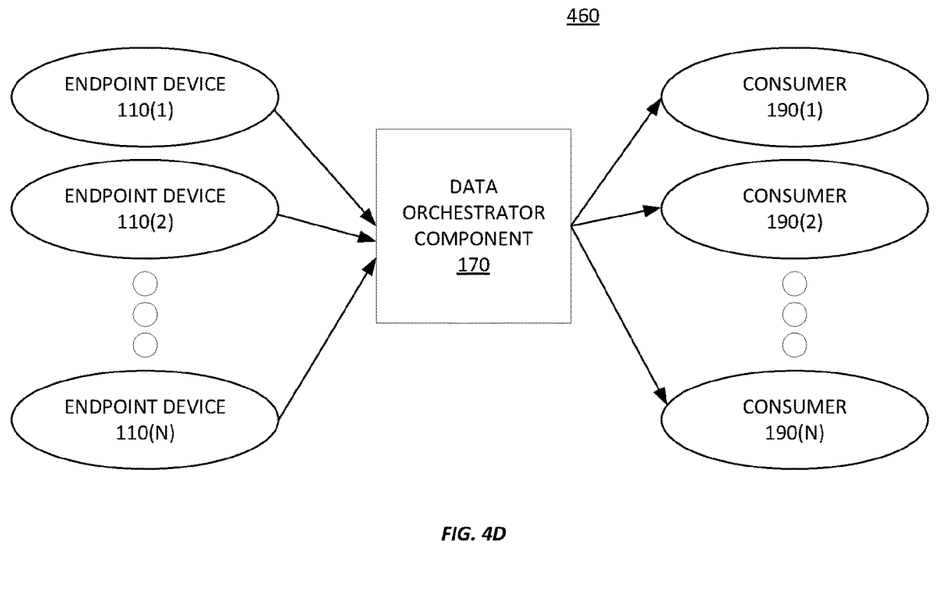
Figure 4E:
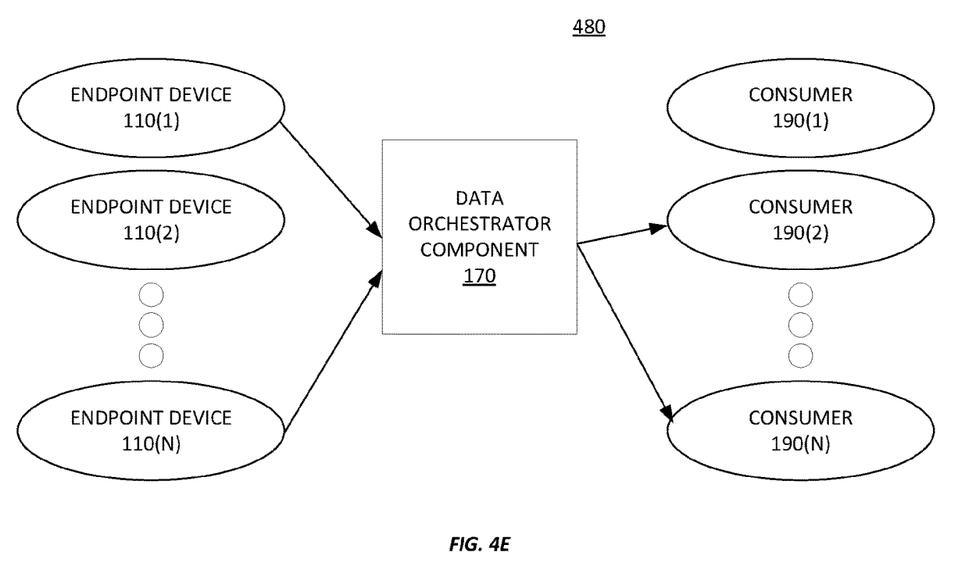

FIG. 4C is a block diagram 440, illustrating a one-to-many data routing scheme. In the depicted embodiment, the data orchestrator component 170 is receiving data from a single endpoint device 110(1) and, based on the dynamically generated routing tables 182, the data orchestrator component 170 determines to transmit the received data on to multiple data consumers 190(1)-(N). Similarly, the access control component 175 of the data orchestrator component 170 can be configured to dynamically generate routing dabbles that implement many-to-many data routing schemes. FIG. 4D is a block diagram 460, illustrating a one-to-one data routing scheme. In the depicted embodiment, the data orchestrator component 170 is receiving data from all of the endpoint devices 110(1)-(N) and, based on the dynamically generated routing tables 182, the data orchestrator component 170 determines to transmit the received data on to all of the consumer 190(1)-(N). Likewise, FIG. 4E is a block diagram 480, illustrating a many-to-many data routing scheme, where the data orchestrator component 170 is receiving data from a some of the endpoint devices 110(1) and 110(N) and, based on the dynamically generated routing tables 182, the data orchestrator component 170 determines to transmit the received data on to some of the consumers 190(2) and 190(N).

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method, comprising:
   receiving, at a data orchestrator, from an endpoint device, a plurality of data values collected by the endpoint device;
   determining an identifier that uniquely identifies the endpoint device;
   accessing one or more routing tables using the determined identifier and device type data corresponding to the plurality of data values to determine one or more data consumers to route the plurality of data values to, wherein the one or more routing tables were generated based on at least one of (i) device claim information relating to the endpoint device, (ii) license data relating to the one or more data consumers, and (iii) user information associated with the one or more data consumers; and
   providing, by the data orchestrator, at least a portion of the plurality of data values from the endpoint device to the determined one or more data consumers for consumption,
   wherein the endpoint device comprises one of a plurality of Internet of Things (IoT) devices within an IoT network, and different layers of IoT stack are decoupled from each other within a tenancy context to allow sharing of data between tenancy stovepipes.

2. The method of claim 1, wherein the identifier that uniquely identifies the endpoint device comprises a unique identifier assigned to the endpoint device by a manufacturer of the endpoint device at a time of manufacture of the endpoint device.

3. The method of claim 1, wherein the plurality of data values collected by the endpoint device comprise a plurality of sensor data values collected by one or more sensor devices of the endpoint device.

4. The method of claim 3, wherein the one or more routing tables are dynamically generated by an access control component based on data received from one or more data aggregation components, and wherein the one or more data aggregation components are configured to collect, aggregate and normalize access control-related data from a plurality of sources.

5. The method of claim 1, wherein the device claim information further comprises user information associated with a device registration operation for the endpoint device.

6. The method of claim 1, wherein the license data relating to the one or more data consumers further comprises an indication from a license service specifying one or more license types for one or more licenses procured by the one or more data consumers and an indication of whether the one or more licenses are presently valid.

7. The method of claim 1, wherein the user information associated with the one or more data consumers further comprises a user credential included in a registration of the one or more data consumers.

8. The method of claim 1, wherein providing at least a portion of the plurality of data values to the determined one or more data consumers further comprises at least one of (i) transmitting the at least a portion of the plurality of data values to the one or more data consumers using a push methodology, (ii) transmitting the at least a portion of the plurality of data values to the one or more data consumers using a pub/sub methodology, and (iii) providing an Application Programming Interface (API) through which the one or more data consumers can request the at least a portion of the plurality of data values and, responsive to such a request, transmitting the at least a portion of the plurality of data values to the one or more data consumers using a pull methodology.

9. The method of claim 1, wherein the endpoint device comprises a plurality of endpoint devices, the one or more consumers comprises a plurality of consumers, and the data orchestrator is configured to transmit selectively the plurality of data values from the plurality of endpoint devices to the plurality of consumers according to the one or more routing tables using the identifier of the endpoint device and the device data type which correspond to the plurality of data values.

10. A system, comprising:
    one or more computer processors; and
    a non-transitory memory containing computer program code that, when executed by operation of the one or more computer processors, performs an operation comprising:
    receiving, at a data orchestrator, from an endpoint device, a plurality of data values collected by the endpoint device;
    determining an identifier that uniquely identifies the endpoint device;
    accessing one or more routing tables using the determined identifier and device type data corresponding to the plurality of data values to determine one or more data consumers to route the plurality of data values to, wherein the one or more routing tables were dynamically generated based on at least one of (i) device claim information relating to the endpoint device, (ii) license data relating to the one or more data consumers, and (iii) user information associated with the one or more data consumers; and
    transmitting, by the data orchestrator, at least a portion of the plurality of data values from the endpoint device to the determined one or more data consumers for consumption,
    wherein the endpoint device comprises one of a plurality of Internet of Things (IoT) devices within an IoT network, and different layers of IoT stack are decoupled from each other within a tenancy context to allow sharing of data between tenancy stovepipes.

11. The system of claim 10, wherein the identifier that uniquely identifies the endpoint device comprises a unique identifier assigned to the endpoint devices by a manufacturer of the endpoint device at a time of manufacture of the endpoint device.

12. The system of claim 10, wherein the plurality of data values collected by the endpoint device comprise a plurality of sensor data values collected by one or more sensor devices of the endpoint device.

13. The system of claim 10, wherein the device claim information further comprises user information associated with a device registration operation for the endpoint device.

14. The system of claim 10, wherein the license data relating to the one or more data consumers further comprises an indication from a license service specifying one or more license types for one or more licenses procured by the one or more data consumers and an indication of whether the one or more licenses are presently valid.

15. The system of claim 10, wherein the user information associated with the one or more data consumers further comprises a user credential included in a registration of the one or more data consumers.

16. A non-transitory computer-readable medium containing computer program code that, when executed by operation of one or more computer processors, performs an operation comprising:

receiving, at a data orchestrator, from an endpoint device, a plurality of data values collected by the endpoint device;

determining an identifier that uniquely identifies the endpoint device;

accessing one or more routing tables using the determined identifier and device type data corresponding to the plurality of data values to determine one or more data consumers to route the plurality of data values to, wherein the one or more routing tables were dynamically generated based on at least one of (i) device claim information relating to the endpoint device, (ii) license data relating to the one or more data consumers, and (iii) user information associated with the one or more data consumers; and     transmitting, by the data orchestrator, at least a portion of the plurality of data values from the endpoint device to the determined one or more data consumers for consumption,     wherein the endpoint device comprises one of a plurality of Internet of Things (IoT) devices within an IoT network, and different layers of IoT stack are decoupled from each other within a tenancy context to allow sharing of data between tenancy stovepipes.

17. The non-transitory computer-readable medium of claim 16, wherein the identifier that uniquely identifies the endpoint device comprises a unique identifier assigned to the endpoint device by a manufacturer of the endpoint device at a time of manufacture of the endpoint device.

18. The non-transitory computer-readable medium of claim 16, wherein the plurality of data values collected by the endpoint device comprise a plurality of sensor data values collected by one or more sensor devices of the endpoint device.

19. The non-transitory computer-readable medium of claim 16, wherein the device claim information further comprises user information associated with a device registration operation for the endpoint device.

20. The non-transitory computer-readable medium of claim 16, wherein the license data relating to the one or more data consumers further comprises an indication from a license service specifying one or more license types for one or more licenses procured by the one or more data consumers and an indication of whether the one or more licenses are presently valid.

21. The non-transitory computer-readable medium of claim 16, wherein the user information associated with the one or more data consumers further comprises a user credential included in a registration of the one or more data consumers.

* * * * *